US009972322B2

(12) United States Patent
Biswal et al.

(10) Patent No.: US 9,972,322 B2
(45) Date of Patent: May 15, 2018

(54) SPEAKER RECOGNITION USING ADAPTIVE THRESHOLDING

(71) Applicant: Intel Corporation, Santa Clara, CA (US)

(72) Inventors: Narayan Biswal, Folsom, CA (US); Gokcen Cilingir, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 36 days.

(21) Appl. No.: 15/083,548

(22) Filed: Mar. 29, 2016

(65) Prior Publication Data

US 2017/0287490 A1 Oct. 5, 2017

(51) Int. Cl.
| | |
|---|---|
| *G10L 15/20* | (2006.01) |
| *G10L 17/20* | (2013.01) |
| *G10L 17/22* | (2013.01) |
| *G10L 17/06* | (2013.01) |
| *G10L 25/81* | (2013.01) |
| *G10L 17/02* | (2013.01) |
| *G10L 15/26* | (2006.01) |
| *G10L 25/78* | (2013.01) |

(52) U.S. Cl.
CPC .............. *G10L 17/20* (2013.01); *G10L 15/20* (2013.01); *G10L 17/02* (2013.01); *G10L 17/06* (2013.01); *G10L 17/22* (2013.01); *G10L 25/81* (2013.01); *G10L 15/265* (2013.01); *G10L 25/78* (2013.01)

(58) Field of Classification Search
CPC combination set(s) only.
See application file for complete search history.

(56) References Cited

U.S. PATENT DOCUMENTS

| | | | |
|---|---|---|---|
| 6,735,562 B1 | 5/2004 | Zhang et al. | |
| 7,487,089 B2* | 2/2009 | Mozer | G06F 21/32 382/116 |
| 9,607,619 B2* | 3/2017 | Jiang | G10L 17/20 |
| 2007/0003110 A1 | 1/2007 | Gutta et al. | |
| 2010/0268537 A1 | 10/2010 | Al-Telmissani | |
| 2014/0278389 A1 | 9/2014 | Zurek et al. | |

OTHER PUBLICATIONS

International Search Report and Written Opinion for International Patent Application No. PCT/US2017/018716, dated Jun. 12, 2017.
Poh, Norman et al., "Improving Fusion with Margin-Derived Confidence in Biometric Authentication Tasks", International Conference on Audio and Video Based Biometric Person Authentication (AVBPA 2005), LNCS 3546, pp. 474-483, 2005.

\* cited by examiner

*Primary Examiner* — Vu B Hang
(74) *Attorney, Agent, or Firm* — Green, Howard & Mughal LLP.

(57) ABSTRACT

Techniques related to speaker recognition are discussed. Such techniques may include determining an adaptive speaker recognition threshold based on a speech to noise ratio and noise type label corresponding to received audio and performing speaker recognition based on the adaptive speaker recognition threshold and a speaker recognition score corresponding to received audio.

23 Claims, 7 Drawing Sheets

SPEAKER RECOGNITION USING ADAPTIVE THRESHOLDING

BACKGROUND

Speaker recognition is an important application that may provide new modalities for multifactor biometric device login or authentication. Furthermore, speaker recognition may transform speech applications from generic to personalized by recognizing particular speakers from a group or the like. For example, recognizing particular speakers from a group may provide for improved speech transcription (e.g., as the transcription of the speaker may then be based on the particular characteristics of that speaker), associating particular portions of a transcription with the speakers that uttered the portions, or the like.

A variety of techniques may be employed to perform speaker recognition. For example, in the context of speaker verification, where a claimed identity may be identified or evaluated based on a spoken utterance, a final result scored based on the utterance and the application of a speaker model may be compared to a threshold, which may quantify the minimum similarity required for a positive verification of the utterance. For example, the threshold may provide a balance between false rejection and false acceptance.

It may be advantageous to provide speaker recognition with improved accuracy (e.g., lower false rejection rates and false acceptance rates). It is with respect to these and other considerations that the present improvements have been needed. Such improvements may become critical as the desire to provide high quality speaker recognition becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
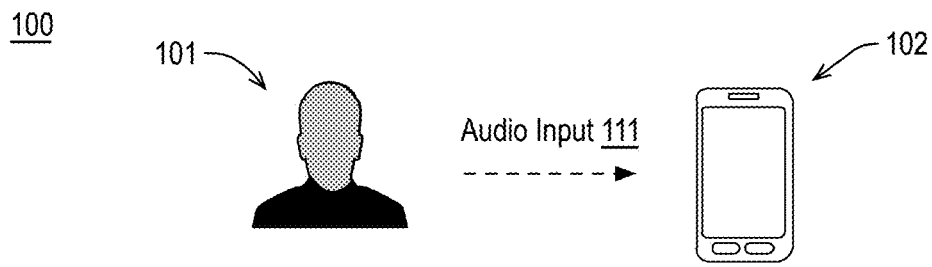
FIG. 1 is an illustrative diagram of an example setting for providing speaker recognition.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to speaker recognition using adaptive thresholding.

Speaker recognition may provide for speaker acceptance or rejection (e.g., in the context of device access or security), speaker identification, or the like. For example, speaker recognition techniques may provide for new modalities for device login and/or for application specific uses based on recognized users. In some embodiments discussed herein, speaker recognition may include determining an adaptive speaker recognition threshold based on received audio. For example, in the context of speaker recognition, the adaptive speaker recognition threshold may provide or quantify a minimum similarity amount for positive recognition of a speaker. For example, based on the received audio, a speech to noise ratio and a noise type label may be determined. The speech to noise ratio and the noise type label may be determined using any suitable technique or techniques. For example, the speech to noise ratio may be determined based on energy thresholding, machine learning techniques, or the like and the noise type label may be determined based on a mixture model such as a Gaussian Mixture Model or the like.

The adaptive speaker recognition threshold may be determined based on the speech to noise ratio, the noise type label based, and a target false accept rate or target false reject rate or the like. For example, based on the application performing speaker recognition, a target false accept rate, target false reject rate, or other indicator may be used to determine the adaptive speaker recognition threshold. For example, speaker recognition for user authentication to access a device may have a target false accept rate that is lower than a speaker recognition application that will allow the speaker to open a file on the device, which in turn may have a target false accept rate that is lower than a speaker recognition application that will allow a user play music on the device. Based on the noise ratio, the noise type label based, and the target false accept rate or target false reject rate, a look up table may be accessed to generate the adaptive speaker recognition threshold. For example, a look up table or similar data structure may be predefined based on pretraining and accessed in real time to generate the adaptive speaker recognition threshold.

The pretraining may include providing a large corpus of speech samples from a diverse population of speakers. For anticipated speech to noise ratio and noise type label scenarios (e.g., expected noise scenarios), the speech samples may be combined with corresponding noise recordings. For each noise scenario, expected false accept and false reject rates may be determined and a speaker recognition threshold providing the best performance may be recorded. Such techniques may be repeated to generate a data structure such as a look up table that may be accessed based on a speech to noise ratio, a noise type label, and a target false accept/reject rate to provide an adaptive speaker recognition threshold. During implementation, as discussed, for received audio, a speech to noise ratio, a noise type label based, and a target false accept rate or target false reject rate may be determined and the data structure may be accessed in real time to provide an adaptive speaker recognition threshold, which may be used by the application performing speaker recognition.

As discussed, the application performing speaker recognition may include any suitable application such as a device login application, a biometric security application, an authenticated command application, or the like. Furthermore, speaker recognition may be performed based on the received audio based on a single speaker comparison (e.g., to determine whether the received audio is associated with a particular identity) or based on a multi-speaker comparison (e.g., to determine which identity the received audio is associated with). Such techniques are discussed further herein.

The discussed techniques may provide improved speaker recognition or speaker identification through adaptive thresholding. Such techniques may include acoustic environment classification via signal to noise ratio determination and noise type classification, speaker identification threshold determination, and speaker identification or recognition. Such techniques may be applied to any suitable speaker recognition or speaker identification applications such as biometric security applications, system login applications, speech recognition applications, secured voice based command and control applications, personal assistant applications, perceptual computing applications, or the like. The discussed techniques may provide for predicting noise characteristics of an acoustic environment (e.g., based on a noise type label and a speech to noise ratio) and determining an adaptive threshold capability for speaker recognition.

FIG. 1 is an illustrative diagram of an example setting 100 for providing speaker recognition, arranged in accordance with at least some implementations of the present disclosure. As shown in FIG. 1, setting 100 may include a user 101 providing audio input 111 to a device 102. Although illustrated with respect to a single user 101, as discussed further herein, in some examples, one or more of multiple users may provide audio input 111 to device 102. As shown, in some examples, speaker recognition may be implemented via device 102 such that device 102 may be a smartphone. However, device 102 may be any suitable device such as a computer, a laptop, an ultrabook, a smartphone, a tablet, a phablet, a wearable device such as a smart watch or eye glasses, a security device, a conferencing device, a cloud based computing device, or the like. In any case, device 102 may be described as a computing device as used herein.

Device 102 may provide any suitable speaker recognition based on audio input 111. For example, device 102 may include or operate a speaker recognition application. The techniques discussed herein may be provided by hardware, firmware, software, or a combination thereof and may accessed or implemented via an application program interface or the like. In an embodiment, user 101 may be attempting to login to or unlock device 102 via speech recognition. If user 101 provides audio input 111 that is identified as corresponding to an allowed user, device 102 may allow access to and, if not, device 102 may remain locked. In another embodiment, user 101 may be attempting to provide audio input 111 such that device 102 may perform a function based on audio input 111. In such contexts, if audio input 111 is identified as corresponding to an allowed user, device 102 may perform the function. In another embodiment, device 102 may attempt to identify which user of multiple users corresponds to audio input 111. For example, depending on which of multiple users audio input 111 corresponds to, an application may enable particular speech recognition user settings or the like. For example, in such contexts, multiple users may have pretrained corresponding models for speech recognition and, based on audio input 111, a speech recognition may apply the model corresponding to user 101 for speech recognition. Such examples may be particularly useful in meeting settings such that speech recognition may be performed based on the recognized user to improve accuracy.

In any event, audio input 111 may include speech and noise corresponding to setting 100. The speech may include any suitable speech, utterance, sound, or the like. The noise similarly may include any suitable background noise or the like such as car noise, outside noise, babble noise, side noise, white noise, music noise, second speaker noise, side music noise, side second speaker noise, clean or no noise, or the like. The speaker recognition techniques discussed herein may provide, via device 102, prediction of the type of noise corresponding to audio input 111 (e.g., in the acoustic environment of setting 100), estimation of the speech to noise ratio corresponding to audio input 111 (e.g., in the acoustic environment of setting 100), and determination of an adaptive speaker recognition threshold in real time based on the type of noise and the speech to noise ratio.

Figure 2:
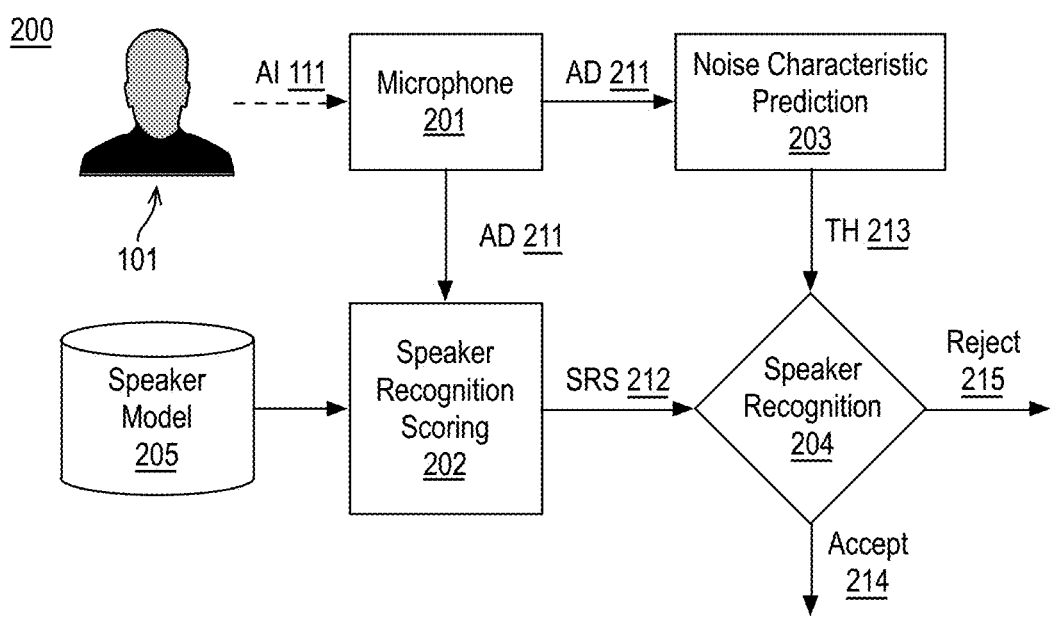
FIG. 2 is an illustrative diagram of an example system for providing speaker recognition.

FIG. 2 is an illustrative diagram of an example system 200 for providing speaker recognition, arranged in accordance with at least some implementations of the present disclosure. As shown in FIG. 2, system 200 may include a microphone 201 to receive audio input 111, a speaker recognition scoring module 202, a noise characteristic prediction module 203, a speaker recognition module 204, and a speaker model or models 205. For example, as shown in FIG. 2, speaker recognition scoring module 202 may provide a speaker recognition score (SRS) 212 to speaker recognition module 204 and, based on a comparison of speaker recognition score 212 to an adaptive threshold (TH) 213 received from noise characteristic prediction module 203, speaker recognition module 204 may accept (e.g., provide an accept signal 214) user 101 as corresponding to a target user or speaker recognition module 204 may reject (e.g., provide a reject signal 215) user 101 as corresponding to the target user.

In other examples, speaker recognition scoring module 202 may apply multiple speaker models 205 to provide multiple speaker recognition scores 212 and speaker recognition module 204 may associate audio input 111 with a particular target user if the speaker recognition score for any target user is more than adaptive threshold 213. If no user has a speaker recognition score more than adaptive threshold 213, speaker recognition module 204 may provide reject signal 215. If multiple target users have speaker recognition scores more than adaptive threshold 213, speaker recognition module 204 may provide a target user corresponding to a largest of the passing speaker recognition scores or all passing target users.

For example, although FIG. 1 illustrates an example speaker recognition pipeline for an accept/reject determination for speaker verification, the techniques and systems discussed herein may be implemented via any speaker recognition pipeline or architecture such as open set or closed set speaker identification, phrase dependent or phrase independent speaker identification, or the like.

As shown, microphone 201 may receive audio input (AI) 111 from user 101 (or multiple users or an environment or the like). In some examples, audio input 111 is issued by user 101 to login to system 200 and/or to have system 200 perform an operation. Microphone 201 may receive any audio input including background noise or even silence. For example, audio input 111 may include any speech issued by user 101 and any other background noise or silence or the like in the environment of microphone 201. Audio input 111 may be characterized as audio, input audio, input speech, an utterance, or the like. Microphone 201 may receive audio input 111 (e.g., as sound waves in the air) and convert audio input 111 to an electrical signal such as a digital signal to generate audio data (AD) 211. For example, audio data 211 may be stored in memory (not shown in FIG. 2), transferred for continued processing, or the like.

As shown, speaker recognition scoring module 202 may receive audio data 211 and speaker recognition scoring module 202 may generate speaker recognition score 212. Speaker recognition scoring module 202 may generate speaker recognition score 212 using any suitable technique or techniques. In an embodiment, speaker recognition scoring module 202 may extract features from audio data 211 and apply speaker model 205 based on the extracted features to generate speaker recognition score 212. The extracted features may include any suitable features, feature vectors, or the like such as coefficients representing a power spectrum of audio data 211. Furthermore, speaker recognition scoring module 202 may implement any suitable speaker recognition scoring model via speaker model 205. For example, the speaker recognition scoring model may be a mixture model such as a Gaussian Mixture Model, a neural network, or the like. Speaker recognition scoring module 202 may apply speaker model 205 such that speaker model 205 may be pretrained based on a training sequence or the like performed by a target user. For example, a user of system 200 may provide speech to system 200 to generate speaker model 205 based on the received audio. As discussed, multiple users may generate multiple speaker models 205, which may be applied by speaker recognition scoring module 202.

Speaker recognition score 212 may include any suitable data or data structure indicating a speaker recognition score. For example, speaker recognition score 212 may include a value or score representative of the similarity between audio input 111 received from user 101 and a modeled audio input corresponding to a target user. For example, a higher value or score may indicate a greater similarity between audio input 111 received from user 101 and a modeled audio input corresponding to a target user. As used herein, the term target user may include any user corresponding to a pretrained speaker model. Furthermore, received audio may be associated with an unknown user, a user being tested, or the like.

Also as shown, noise characteristic prediction model 203 may receive audio data 211 and noise characteristic prediction model 203 may generate adaptive threshold 213 based on audio data 211. Noise characteristic prediction model 203 may generate adaptive threshold 213 using any suitable technique or techniques. For example, noise characteristic prediction model 203 may generate adaptive threshold 213 based on characteristics of audio data 211 such as a speech to noise ratio corresponding to audio data 211, a noise type label corresponding to audio data 211, and/or a target false accept or reject rate corresponding to audio data 211.

Figure 3:
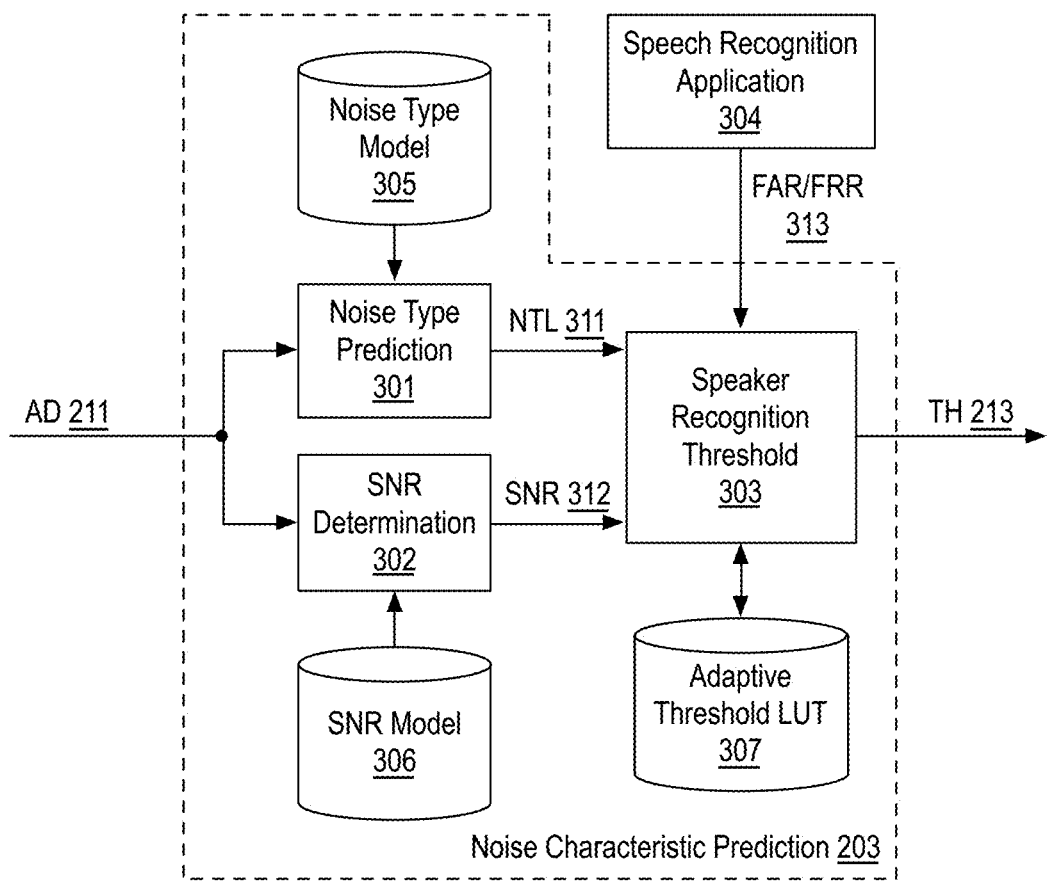
FIG. 3 illustrates an example noise characteristic prediction module.

FIG. 3 illustrates an example noise characteristic prediction module 203, arranged in accordance with at least some implementations of the present disclosure. As shown in FIG. 3, noise characteristic prediction module 203 may include a noise type prediction module 301, a speech to noise (SNR) determination module 302, a speaker recognition threshold module 303, a noise type model 305, a speech to noise (SNR) model 306, and an adaptive threshold look up table (LUT) 307. For example, noise characteristic prediction module 203 may be implemented via system 200 or any suitable speech recognition system, pipeline, architecture, or the like. As shown, noise characteristic prediction module 203 may received audio data 211 and noise characteristic prediction module 203 may generate adaptive threshold 213 based on audio data 211.

For example, noise type prediction module 301 may receive audio data 211 and noise type prediction module 301 may generate a noise type label (NTL) 311 based on audio data 211. Noise type prediction module 301 may generate noise type label 311 using any suitable technique or techniques. For example, noise type model 305 may be a pretrained model for determining noise type label 311. Noise type prediction module 301 may implement noise type model 305 based on audio data 211 to generate noise type label 311. Noise type model 305 may be any suitable model such as a machine learning model, mixture model, a Gaussian Mixture Model, a Gaussian Mixture Model-Universal Background Model (GMM-UBM), or the like.

For example, noise type model 305 may be pretrained based on a large dataset of instances of different noise classes such that a mixture model may be fit over each class of noise. The pretrained mixture model or the like may be stored as noise type model 305. The noise classes may include any suitable noise class such as those expected to be in setting 100 during an utterance by user 101 (please refer to FIG. 1). For example, the noise classes may include a car noise class, an outside noise class, a babble noise class, a side noise class, a white noise class, a music noise class, a second speaker noise class, a side music noise class, a side second speaker noise class, a clean or no noise class, or the like.

During implementation, based on audio data 211 (e.g., a novel received noise clip), noise type prediction module 301 may score audio data 211 based on noise type model 305 (e.g., including a model for each implemented noise class) and noise type prediction module 301 may predict a noise class based on a highest likelihood score from among likelihood scores for each implemented noise class. For example, noise type label 311 may be a noise label corresponding to the highest likelihood score. For example, if five noise classes are implemented, five likelihood scores may be generated (e.g., one for each noise class) and noise type label 311 may be the label corresponding to the noise class having the highest likelihood score. Noise type label 311 may include any suitable data or data structure representing a noise class such as a label (e.g., "no noise", "babble", etc.) or a value mapped to such a label or the like.

Furthermore, as shown, speech to noise determination module 302 may also receive audio data 211 and speech to noise determination module 302 may generate a speech to noise ratio (SNR) 312 based on audio data 211. Speech to noise determination module 302 may generate speech to noise ratio 312 using any suitable technique or techniques. For example, speech to noise determination module 302 may classify audio data 211 (e.g., an audio segment) as speech vs. noise and generate speech to noise ratio 312 as a ratio of the power of the speech portion to the power of the noise portion of audio data 211. For example, speech to noise ratio (SNR) model 306 may be a pretrained model for determining speech to noise ratio 312. Speech to noise determination module 302 may implement speech to noise ratio model 306 based on audio data 211 to generate speech to noise ratio 312. Speech to noise ratio model 306 may be any suitable model such as a machine learning model, mixture model, a Gaussian Mixture Model, a Hidden Markov Model, or the like.

For example, noise type model 305 may be pretrained and, during implementation, based on audio data 211, speech to noise determination module 302 may score audio data 211 based on speech to noise ratio model 306 to generate speech to noise ratio 312. Although illustrated with respect to speech to noise determination module 302 implementing speech to noise ratio model 306, speech to noise ratio 312 may be generated based on audio data 211 using any suitable technique or techniques such as energy threshold techniques or the like.

As shown in FIG. 3, speaker recognition threshold module 303 may receive noise type label 311, speech to noise ratio 312, and a false accept rate or false reject rate 313 from speech recognition application 304. For example, speech recognition application 304 may generate a false accept or reject rate for implementation by speaker recognition threshold module 303. In the context of a false accept rate, the false accept rate may be associated with the application being performed by speech recognition application 304. For example, for biometric security applications, device login applications, or the like, a low false accept rate may be used such that it may be difficult for a user to attain access. For example, such applications may be associated with security, data protection, or the like. In secured voice based command and control applications, personal assistant applications, perceptual computing applications, or the like a higher false accept rate may be used such that it may be less difficult for a user to attain access. For example, such applications may be more closely associated with convenience and user experience.

Based on noise type label 311, speech to noise ratio 312, and false accept rate or false reject rate 313 speaker recognition threshold module 303 may access adaptive threshold look up table 307 to determine adaptive threshold 213. For example, based on adaptive threshold look up table 307 may be predetermined or pretrained to include a best choice adaptive threshold based on noise type label 311, speech to noise ratio 312, and false accept rate or false reject rate 313. Although illustrated with respect to speaker recognition threshold module 303 accessing adaptive threshold look up table 307 to determine adaptive threshold 213, speaker recognition threshold module 303 may determine adaptive threshold 213 using any suitable technique or techniques.

As discussed, adaptive threshold look up table 307 may be a predetermined or pretrained look up table. For example, in a pretraining phase, thresholds that provide the best results in particular noise scenarios may be estimated. For example, such thresholds may be estimated through validation techniques. In an embodiment, a large corpus may be generated and used such that the corpus includes multiple speakers (e.g., 30 or more) sampled from a diverse population (e.g., diverse in terms of gender, ethnicity, language, age, etc.) and multiple training and test utterances. For example, the corpus may be recorded in a clean lab environment with high quality microphones with minimal ambient noise.

For each anticipated noise scenario, noise recordings may be generated or obtained. For example, the noise recordings may be representative of the noise type labels to be implemented via noise type prediction module 301 (e.g., car noise, outside noise, babble noise, side noise, white noise, etc.). The noise recordings may be mixed with the speech recordings at a good range of speech to noise (SNR) values. For each noise scenario (e.g., combination of noise type label and speech to noise value), expected false accept and false reject rates may be determined at multiple threshold values with frequent increments. At particular target false accept or false reject rates, the threshold that provides the best performance (e.g., for a false accept rate, the threshold that provides the lowest false reject rate) may be recorded for each noise scenario (e.g., comprised of tuples of noise type and SNR value as discussed) and stored in any suitable data structure such as adaptive threshold look up table 307.

With continued reference to FIG. 3, during implementation, noise type label 311, speech to noise ratio 312, and false accept rate or false reject rate 313 corresponding to audio data 211 may be used to determine adaptive threshold 213 corresponding to audio data 211. For example, adaptive threshold 213 may be a best choice speaker recognition threshold for the particular noise scenario corresponding to audio data 211. Adaptive threshold 213 may be characterized as an adaptive speaker recognition threshold, an adaptive speaker identification threshold, an adaptive speaker recognition scoring threshold, or the like. Furthermore, adaptive threshold 213 may be generated at any frequency or based on any changes with respect to noise type label 311, speech to noise ratio 312, and false accept rate or false reject rate 313, or the like.

Returning to FIG. 2, as discussed, adaptive threshold 213 may be received by speaker recognition module 204, which may compare adaptive threshold 213 to speaker recognition score 212 to generate accept signal 214 or reject signal 215. For example, if speaker recognition score 212 exceeds adaptive threshold 213 (or speaker recognition score 212 is greater than or equal to adaptive threshold 213 in some examples), speaker recognition module 204 may provide accept signal 214 indicating user 101 matches the target user represented by speaker model 205. If speaker recognition score 212 does not exceed adaptive threshold 213 (or speaker recognition score 212 is more than adaptive threshold 213 in some examples), speaker recognition module 204 may provide reject signal 215 indicating user 101 does not match the target user represented by speaker model 205.

Furthermore, as discussed above, in some examples, multiple users may be evaluated based on the same audio input. For example, for audio data 211, noise characteristic prediction model 203 may generate adaptive threshold 213 as discussed with respect to FIG. 3 or elsewhere herein. Speaker recognition scoring module 202 may generate multiple speaker recognition scores 212 based on audio data 211 and speaker recognition module 204 may accept or reject each score based on adaptive threshold 213 (as discussed with respect to the single target user example) such that accept signal 214 or reject signal 215 is provided for each target user, provide a closest acceptable match (e.g., provide a passing target user that is also the best match if multiple target users pass) via accept signal 214 (e.g., such that accept signal 214 provided an indicator of acceptance and an indicator of the matching target user), provide reject signal 215 (e.g., if all target users fail), or the like.

Such adaptive threshold techniques may provide improved accuracy for speaker recognition as discussed herein. For example, single threshold techniques may provide widely ranging false accept and/or false reject rates in varying noise conditions, which may cause difficulty in speaker recognition. By providing adaptive thresholding based on the noise, if any, surrounding audio input 111, improved false reject rates may be provided at target false accept rates or improved false accept rates may be provided at target false reject rates.

Figure 4:
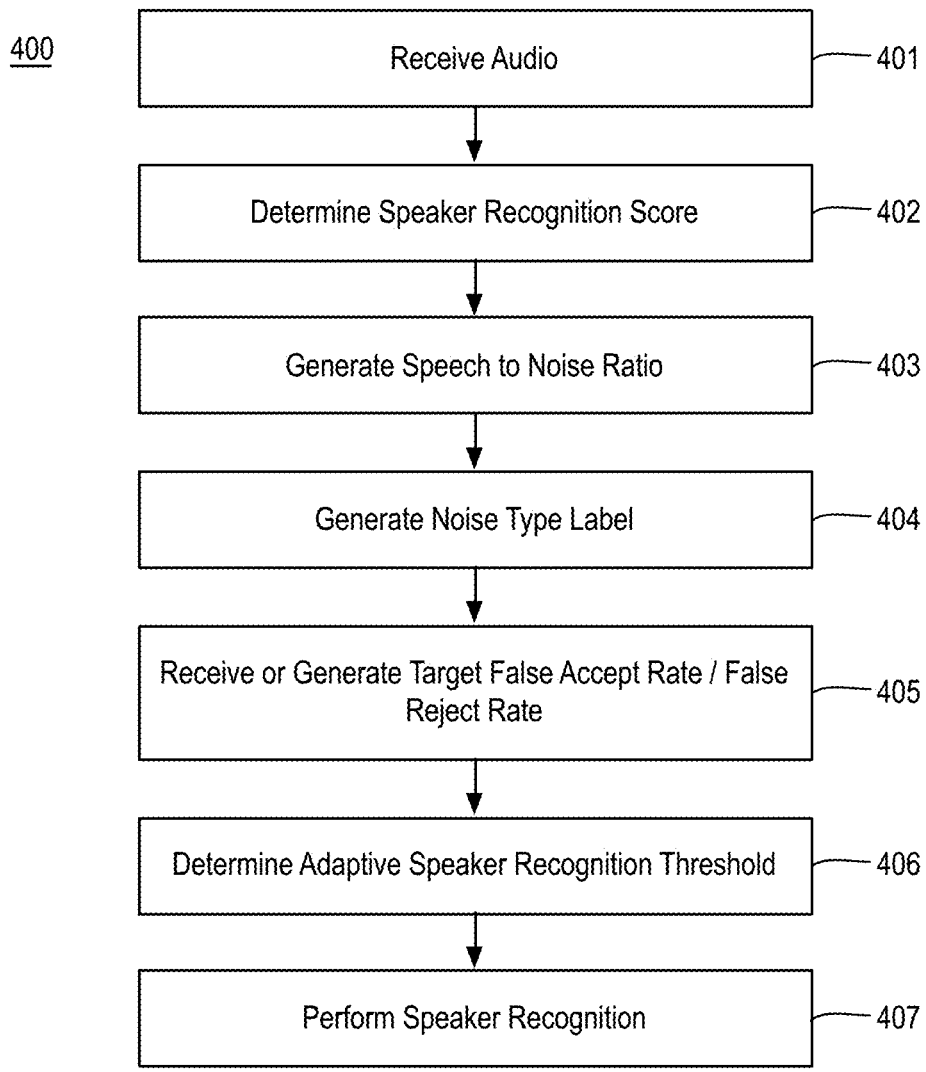
FIG. 4 illustrates an example process for performing speaker recognition with adaptive thresholding.

FIG. 4 illustrates an example process 400 for performing speaker recognition with adaptive thresholding, arranged in accordance with at least some implementations of the present disclosure. Process 400 may include one or more operations 401-407 as illustrated in FIG. 4. Process 400 or portions thereof may be performed by a device or system (e.g., system 200 or any other device or system discussed herein) to provide speaker recognition. Process 400 or portions thereof may be repeated for any amount or instances of received audio, for any number of target users, or the like.

Process 400 may begin at operation 401, where audio may be received. For example, audio may be received by microphone 201 or the like and the received audio may be converted to audio data, an audio signal or the like. As discussed herein, the received audio may include an utterance or speech or the like and noise from the setting or environment of the device receiving the audio. As discussed further below, speaker recognition based on speaker recognition scoring of the received audio may be performed based on an adaptive threshold responsive to the noise, if any, in the received audio.

Processing may continue at operation 402, where a speaker recognition score may be determined corresponding to the received audio input. The speaker recognition score may be determined using any suitable technique or techniques. For example, audio data or an audio signal or the like corresponding to the received audio input may be processed to generate the speaker recognition score. In an embodiment, features may be extracted from the audio data and the features, feature vectors based on the features, a time series of feature vectors, or the like may be processed based on a pretrained speaker model, pretrained classification model, or the like. For example, the pretrained speaker model may correspond to a target user based on the target user having previously performed a training protocol to generate the speaker model. The training protocol may include the user uttering particular phrases or the like to train the pretrained speaker model. Based on the application of the pretrained speaker model, a speaker recognition score may be provided, which provides a speaker recognition value or score or the like with a higher value corresponding to a higher likelihood the speaker of the received audio is the target user that trained the pretrained speaker model.

As discussed, the speaker recognition techniques of process 400 may be provided for a single target user (e.g., a single speaker model for comparison of the received input). In an embodiment, at operation 402, multiple (e.g., two or more) speaker recognition scores may be generated corresponding to the received audio input. For example, a second speaker recognition score may be generated based on the received audio input by applying a second pretrained speaker model corresponding to a second target user. For example, multiple users may pretrain corresponding speaker models based on the discussed training protocol or the like. Application of the second pretrained speaker model (e.g., different than the previously discussed pretrained speaker model) may generate a second speaker recognition score based on the received audio input. Such techniques may be repeated for any number of target users (e.g., two or more speaker recognition scores may be generated based on the same received audio input). In such multi-speaker recognition contexts, speaker recognition may include determining whether any target user passes an adaptive threshold or other techniques as discussed further herein with respect to operation 407.

Processing may continue at operation 403, where a speech to noise ratio may be generated corresponding to the received audio input. The speech to noise ratio may be generated using any suitable technique or techniques. For example, audio data or an audio signal or the like corresponding to the received audio input may be processed to generate the speech to noise ratio. In an embodiment, generating the speech to noise ratio may include extracting features based on the received audio input and applying a pre-trained classification model to the extracted features to provide the speech to noise ratio. For example, generating the speech to noise ratio may include classifying the received audio input as speech or noise and determining the ratio of power of speech to the power. Such classification of the received audio input as speech or noise may be performed using energy thresholding techniques, machine learning algorithms such as Gaussian Mixture Models or Hidden Markov Models, or the like.

Processing may continue at operation 404, where a noise type label may be generated corresponding to the received audio input. The noise type label may be generated using any suitable technique or techniques. For example, audio data or an audio signal or the like corresponding to the received audio input may be processed to generate the noise type label. In an embodiment, generating the noise type label may include extracting features based on the received audio input and applying a pre-trained classification model to the extracted features to provide the noise type label. For example, generating the noise type label may include pre-training a mixture model such as a Gaussian Mixture Model or the like and predicting or generating the noise type label may include applying the pretrained model to generate likelihood ratio scores for the noise types supported by the pretrained model and selecting the noise type label corresponding to a highest likelihood ratio score of the generated likelihood scores.

Processing may continue at operation 405, where a target false accept rate or target false reject rate corresponding to the received audio input may be received or generated. In an embodiment, the target false accept rate or target false reject rate may be received from an application performing speaker recognition. In another embodiment, the target false accept rate or target false reject rate may be generated based on an application performing speaker recognition or based on a default setting or the like. For example, an application performing speaker recognition may have a corresponding security risk or ranking associated therewith such as high, medium, and low or the like. Based on the application and/or the corresponding security risk or ranking, a target false accept rate or target false reject rate may be generated. For example, for high security ranked applications a low false accept rate may be applied, for low security ranked applications a higher false accept rate may be applied, and so on. For example, for a biometric security application such as a login application, security access application, or the like a low or very low false accept rate (e.g., 5% or 2% or less) may be applied. For authenticated command applications such that a device may perform an action only if an utterance is deemed to be from a target user, a higher false accept rate (e.g., 5% or 10% or the like) may be applied. For example, the false accept rate for a biometric security application may be less than the false accept rate for an authenticated command application. In another embodiment, the target false accept rate or target false reject rate may be generated based on a default setting or the like. For example, if no target false reject or accept rate is provided, a default may be used.

Processing may continue at operation 406, where an adaptive speaker recognition threshold may be determined. In an embodiment, the adaptive speaker recognition threshold may be based on the speech to noise ratio and the noise type label. In an embodiment, the adaptive speaker recognition threshold may be based on the speech to noise ratio, the noise type label, and the target false accept rate or target false reject rate. The adaptive speaker recognition threshold may be determined using any suitable technique or techniques. In an embodiment, the adaptive speaker recognition threshold may be determined by accessing a pre-generated or pretrained look up table based on the speech to noise ratio, the noise type label, and the target false accept rate or target false reject rate. For example, the pre-generated or pre-trained look up table may be generated as discussed with respect to FIG. 5 and elsewhere herein. The look up table or similar data structure may provide an optimal adaptive speaker recognition threshold based on the provided arguments (e.g., the speech to noise ratio, the noise type label, and the target false accept rate or target false reject rate).

Processing may continue at operation 407, where speaker recognition may be performed based on the adaptive speaker recognition threshold determined at operation 406. The speaker recognition performed at operation 407 may include any suitable speaker recognition operation or application such as user verification, user identification, or the like. In an embodiment, speaker recognition may provide an accept or reject signal based on a comparison of the speaker recognition score determined at operation 402 and the adaptive speaker recognition threshold. In such contexts, an application may operate responsive to the accept or reject signal to allow access to a device (or memory of a device for example), allow acceptance of a login attempt or the like. For example, performing speaker recognition may include accepting the received audio input as corresponding to a target user when the speaker recognition score exceeds the adaptive speaker recognition threshold or rejecting the received audio input as corresponding to the target user when the speaker recognition score does not exceed the adaptive speaker recognition threshold.

In an embodiment, speaker recognition may provide identification of a target user. For example, multiple speaker recognition scores (e.g., each for a separate target user) determined at operation 402 may be compared to the adaptive speaker recognition threshold and each other to provide speaker recognition. For example, such speaker recognition may provide a signal indicating a target user or users, if any, that pass speaker recognition or a target user, if any, that passes speaker recognition and has a highest speaker recognition score. For example, an identified speaker indicator or the like corresponding to the identified user may be provided. In such contexts, an application may operate responsive to the identified target user or speaker. For example, in the context of speech recognition (e.g., turning received speech into text), the speech recognition application may perform speech recognition using a user profile corresponding to the identified target user. In the context of authenticated command and control applications, the application may allow or disallow particular events based on a user profile corresponding to the identified target user. For example, some users may be able to perform actions and others may not.

Process 400 may be performed and/or repeated any number of times based on any suitable input or based on any suitable pattern. For example, process 400 may be performed responsive to an indicator of received audio, at regular intervals, or the like. Furthermore, some operations of process 400 may be performed responsive to other operations of process 400. For example, operation 406 may be performed when there is a change in speech to noise ratio (e.g., a change greater than a threshold), a change of the noise type label change, a change in the target false accept rate or target false reject rate, a change in the speaker recognition application, or the like.

Figure 5:
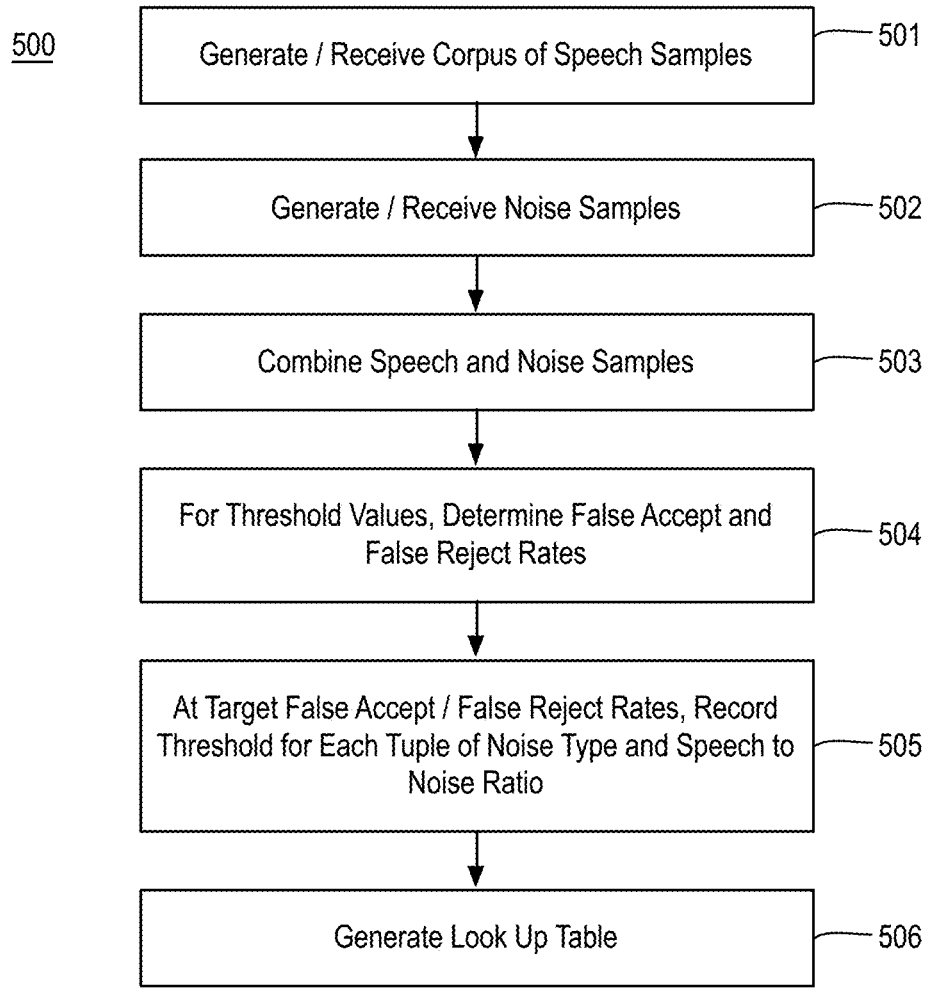
FIG. 5 illustrates an example process for generating a look up table for providing adaptive speaker recognition thresholds.

FIG. 5 illustrates an example process 500 for generating a look up table for providing adaptive speaker recognition thresholds, arranged in accordance with at least some implementations of the present disclosure. Process 500 may include one or more operations 501-506 as illustrated in FIG. 5. Process 500 or portions thereof may be performed by a device or system to generate a data structure for providing an adaptive speaker recognition threshold based on a speech to noise ratio, a noise type label, and a target false accept or false reject rate. Process 500 or portions thereof may be repeated for number of adaptive threshold models, or the like.

Process 500 may begin at operation 501, where a corpus of speech samples may be generated or received. The corpus of speech samples may include any suitable corpus of speech samples. For example, the corpus of speech samples may include a large corpus of speech samples corresponding to multiple speakers (e.g., 30 or more speakers) from a diverse population in terms of gender, ethnicity, language, etc. Furthermore, the corpus of speech samples may include several training and test utterances. In an embodiment, the corpus of speech samples may be recorded in a clean lab environment with high quality microphones such that there is minimal ambient noise.

Processing may continue at operation 502, where noise samples may be generated or received. The noise samples may include any suitable noise samples. For example, for anticipated noise scenarios (e.g., combinations of speech to noise ratios and noise types expected during implementation), noise recordings may be generated or received. For example, a noise recording may be generated for each noise type (e.g., corresponding to noise type labels) and expected speech to noise ratios. In an embodiment, the noise types may include car noise, outside noise, babble noise, side noise, white noise, music noise, second speaker noise, side music noise, side second speaker noise, clean or no noise and the speech to noise ratios may include 10 dB and 15 dB, although any suitable noise types and speech to noise ratios may be used.

Processing may continue at operation 503, where the corpus of speech samples and the noise samples may be combined or mixed. For example, for each combination of the speech samples and the noise samples, a mixed sample may be generated. The mixed samples may be generated using any suitable technique or techniques. For example, the mixed samples may be generated in a high quality lab setting.

Processing may continue at operation 504, where false accept and false reject rates may be determined for each of a set of speaker recognition threshold values. The false accept and false reject rates may be determined using any suitable technique or techniques. For example, for a range of expected or determined speaker recognition scores and/or for a range of expected adaptive speaker recognition threshold values, the false accept and false reject rates may be calculated. The range of expected or determined speaker recognition scores and/or range of expected adaptive speaker recognition threshold values may include any suitable range and any suitable increments within the range. For example, the threshold values may be in the range of about 0.85 to 1.25 with increments of 0.02 or 0.05 or the like being tested.

Processing may continue at operation 505, where, for target false accept rates and/or target false reject rates, a threshold may be recorded for each tuple (e.g., combination) of noise type and speech to noise ratio. For example, for each combination of a target false accept rates or target false reject rates, a noise type, and a speech to noise ratio, an adaptive speaker recognition threshold may be determined and recorded to a suitable data structure such as a look up table or the like. The adaptive speaker recognition threshold may provide the best performance at the particular combination of a target false accept rates or target false reject rates, a noise type, and a speech to noise ratio. For example, for a target false accept rate, a selected noise type, and a selected speech to noise ratio, the adaptive speaker recognition threshold may provide a lowest false reject rate.

Processing may continue at operation 506, where a look up table or similar data structure may be generated. For example, the adaptive speaker recognition thresholds determined for combinations of target false accept rates or target false reject rates, noise types, and speech to noise ratios may be stored in a look up table or similar data structure using any suitable technique or techniques. As discussed with respect to FIG. 4 and elsewhere herein, the look up table or similar data structure generated via process 500 may be implemented to provide an adaptive speaker recognition threshold based on a noise type, a speech to noise ratio, and a target false accept rate or a target false reject rate.

Figure 6:
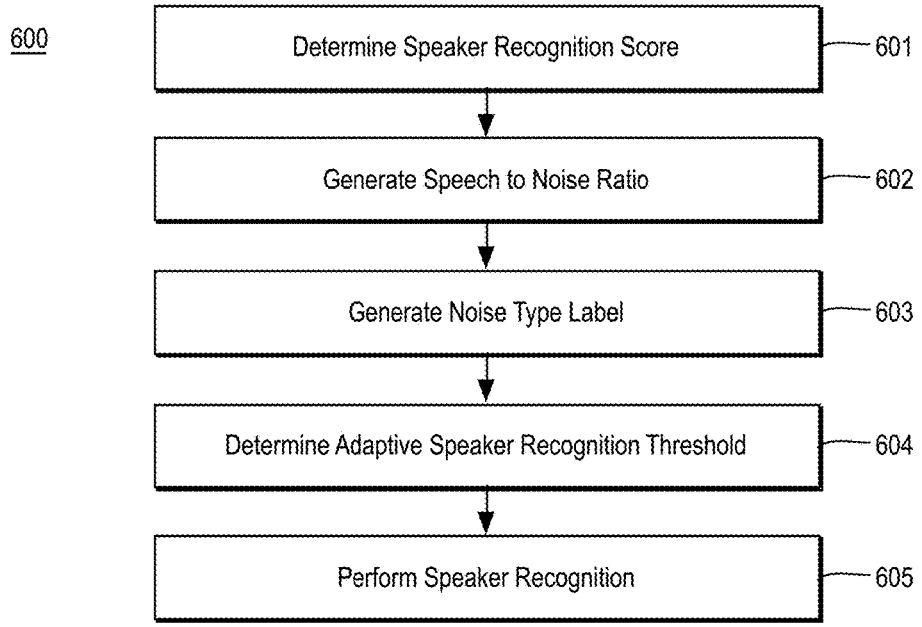
FIG. 6 is a flow diagram illustrating an example process for providing speaker recognition.

FIG. 6 is a flow diagram illustrating an example process 600 for providing speaker recognition, arranged in accordance with at least some implementations of the present disclosure. Process 600 may include one or more operations 601-605 as illustrated in FIG. 6. Process 600 may form at least part of a speaker recognition performed, for example, by system 200. Furthermore, process 600 will be described herein with reference to system 700 of FIG. 7.

Figure 7:
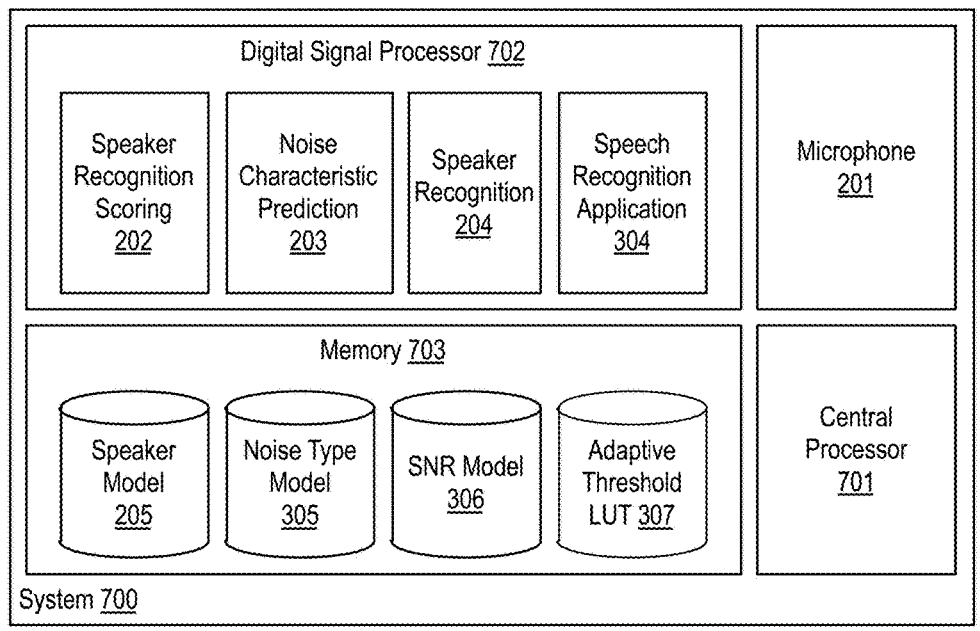
FIG. 7 is an illustrative diagram of an example system for providing speaker recognition.

FIG. 7 is an illustrative diagram of an example system 700 for providing speaker recognition, arranged in accordance with at least some implementations of the present disclosure. As shown in FIG. 7, system 700 may include a central processor 701, a digital signal processor 702, a memory 703, and microphone 201. Also as shown, digital signal processor 702 may include or implement speaker recognition scoring module 202, noise characteristic prediction module 203, speaker recognition module 204, and speech recognition application 304. In some embodiments, noise characteristic prediction module 203 may noise type prediction module 301, signal to noise ratio determination module 302, and speaker recognition threshold module 303. Also as shown, memory 703 may store speaker model(s) 205, noise type model 305, speech to noise ratio model 306, and adaptive threshold look up table 307. Memory 703 may also store audio data, input audio data, audio features, accept/reject indicators, target user identifications, or any other data or data structures as discussed herein.

Central processor 701 and digital signal processor 702 may include any number and type of processing units that may provide the operations as discussed herein. Such operations may be implemented via software or hardware or a combination thereof. For example, digital signal processor 702 may include circuitry dedicated to manipulate data obtained from memory 703 or dedicated memory. Furthermore, central processor 701 may include any number and type of processing units or modules that may provide control and other high level functions for system 700 as well as the operations as discussed herein. In the illustrated example, system 700 may be configured to perform speaker recognition.

Memory 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 703 may be implemented by cache memory. As shown, in an embodiment, speaker recognition scoring module 202, noise characteristic prediction module 203, speaker recognition module 204, and speech recognition application 304 may be implemented via digital signal processor 702. In another embodiment, speaker recognition scoring module 202, noise characteristic prediction module 203, speaker recognition module 204, and speech recognition application 304 may be implemented via central processor 701. In other embodiments, all or some or portions of speaker recognition scoring module 202, noise characteristic prediction module 203, speaker recognition module 204, and speech recognition application 304 may be implemented via an execution unit (EU). The EU may include, for example, programmable logic or circuitry such as a logic core or cores that may provide a wide array of programmable logic functions.

Returning to discussion of FIG. 6, process 600 may begin at operation 601, where a speaker recognition score may be determined based on a received audio input. The speaker recognition score may be determined using any suitable technique or techniques. In an embodiment, speaker recognition scoring module 202 as implemented by digital signal processor 702 may generate the speaker recognition score. In an embodiment, the speaker recognition score may be determined by extracting features from the received audio input and applying a pretrained classification model to the features. In an embodiment, a single speaker recognition score for a target user may be determined. In an embodiment, multiple speaker recognition scores each corresponding to one of multiple target users may be determined.

Processing may continue at operation 602, where a speech to noise ratio may be generated based on the received audio input. The speech to noise ratio may be generated using any suitable technique or techniques. In an embodiment, noise characteristic prediction module 203 as implemented by digital signal processor 702 may generate the speech to noise ratio based on the received audio input. In an embodiment, the speech to noise ratio may be determined by extracting features from the received audio input and applying a pretrained classification model to the features.

Processing may continue at operation 603, where a noise type label may be generated based on the received audio input. The noise type label may be generated using any suitable technique or techniques. In an embodiment, noise characteristic prediction module 203 as implemented by digital signal processor 702 may generate the noise type label based on the received audio input. In an embodiment, the noise type label may be determined by extracting features from the received audio input and applying a pretrained classification model to the features.

Processing may continue at operation 604, where an adaptive speaker recognition threshold may be determined based at least in part on the speech to noise ratio and the noise type label. The adaptive speaker recognition threshold may be generated using any suitable technique or techniques. In an embodiment, noise characteristic prediction module 203 as implemented by digital signal processor 702 may generate the adaptive speaker recognition threshold based at least in part on the speech to noise ratio and the noise type label. In an embodiment, the adaptive speaker recognition threshold may be determined based on the speech to noise ratio, the noise type label, and at least one of a target false accept rate or a target false reject rate corresponding to the received audio input. In an embodiment, determining the adaptive speaker recognition threshold may include accessing a look up table based on the speech to noise ratio, the noise type label, and at least one of a target false accept rate or a target false reject rate to determine the speaker acceptance threshold.

As discussed, in an embodiment, the adaptive speaker recognition threshold may be determined based on the speech to noise ratio, the noise type label, and at least one of a target false accept rate or a target false reject rate corresponding to the received audio input. In an embodiment, process 600 may include determining the target false accept rate or the target false reject rate based on a speaker recognition application corresponding to the received audio input. In an embodiment, the target false accept rate may be a first value when the speaker recognition application is a biometric security application and a second value when the speaker recognition application is an authenticated command application such that the first vale is less than the second value.

Processing may continue at operation 605, where speaker recognition may be performed for the received audio input based on a comparison of the speaker recognition score to the speaker acceptance threshold. Speaker recognition may be performed using any suitable technique or techniques. In an embodiment, speaker recognition module 204 as implemented by digital signal processor 702 may perform speaker recognition. In an embodiment, performing speaker recognition may include accepting the received audio input as corresponding to a target user when the speaker recognition score exceeds the adaptive speaker recognition threshold or rejecting the received audio input as corresponding to the target user when the speaker recognition score does not exceed the adaptive speaker recognition threshold. For example, speaker recognition module 204 as implemented by digital signal processor 702 may provide an accept or reject signal based on the acceptance or rejection of the received audio input.

As discussed, multiple speaker recognition scores each corresponding to one of multiple target users may be determined at operation 601. In an embodiment, a second speaker recognition score may be determined based on the received audio input such that determining the speaker recognition score includes applying a speaker model corresponding to a first user and determining the second speaker recognition score includes applying a second speaker model corresponding to a second user and such that the first and second speaker models are different. In an embodiment, performing the speaker recognition may include a second comparison of the second speaker recognition score to the adaptive speaker recognition threshold. In an embodiment, an identified speaker indicator corresponding to the first user or the second user based on the comparison and the second comparison may be provided. For example, if one of the first or second users has a speaker recognition score greater than the adaptive speaker recognition threshold, the identified speaker indicator may identify the user corresponding to the speaker recognition score greater than the adaptive speaker recognition threshold.

Process 600 or portions thereof may be repeated to provide speaker recognition. In an embodiment, a second adaptive speaker recognition threshold may be determined based at least in part on a second speech to noise ratio and a second noise type label corresponding to a second received audio input and a second speaker recognition may be performed for the second received audio input based on a second comparison of a second speaker recognition score to the second adaptive speaker recognition threshold such that the first and second adaptive speaker recognition thresholds are different. Such techniques may be in response to a change in the speaker recognition application, a newly received audio input, or the like.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
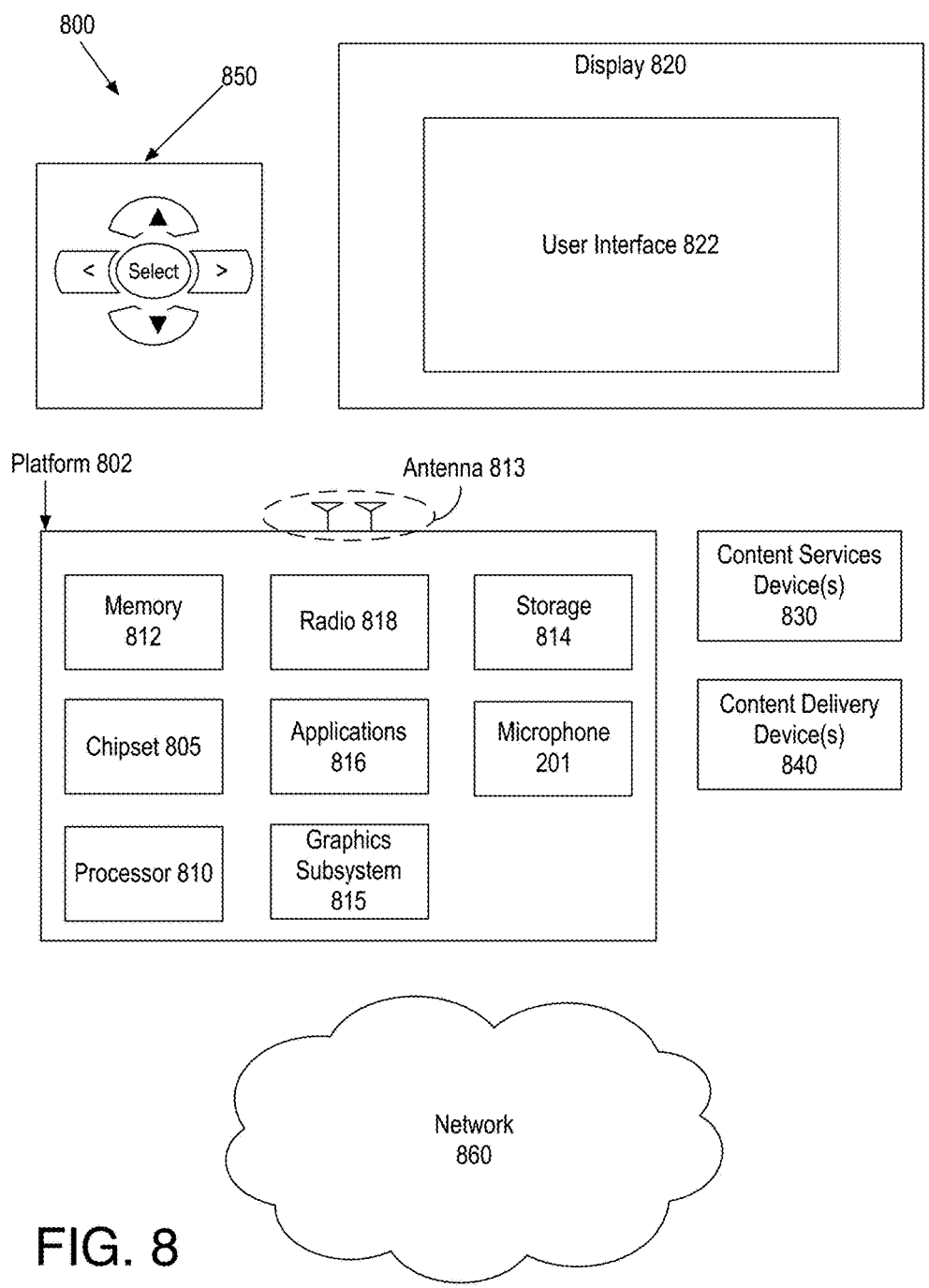
FIG. 8 is an illustrative diagram of an example system.

FIG. 8 is an illustrative diagram of an example system 800, arranged in accordance with at least some implementations of the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 800 includes a platform 802 coupled to a display 820. Platform 802 may receive content from a content device such as content services device(s) 830 or content delivery device(s) 840 or other similar content sources. As shown, in some examples, system 800 may include microphone 201 implemented via platform 802. Platform 802 may receive input speech via microphone 201 as discussed herein. A navigation controller 850 including one or more navigation features may be used to interact with, for example, platform 802 and/or display 820. Each of these components is described in greater detail below.

In various implementations, system 800 may provide speaker recognition as described. For example, speaker recognition may be provided for a device as described. In other implementations, system 800 may provide for generating an adaptive speaker recognition threshold as discussed herein. Such training may be performed offline prior to speaker recognition for example.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/ or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 815. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
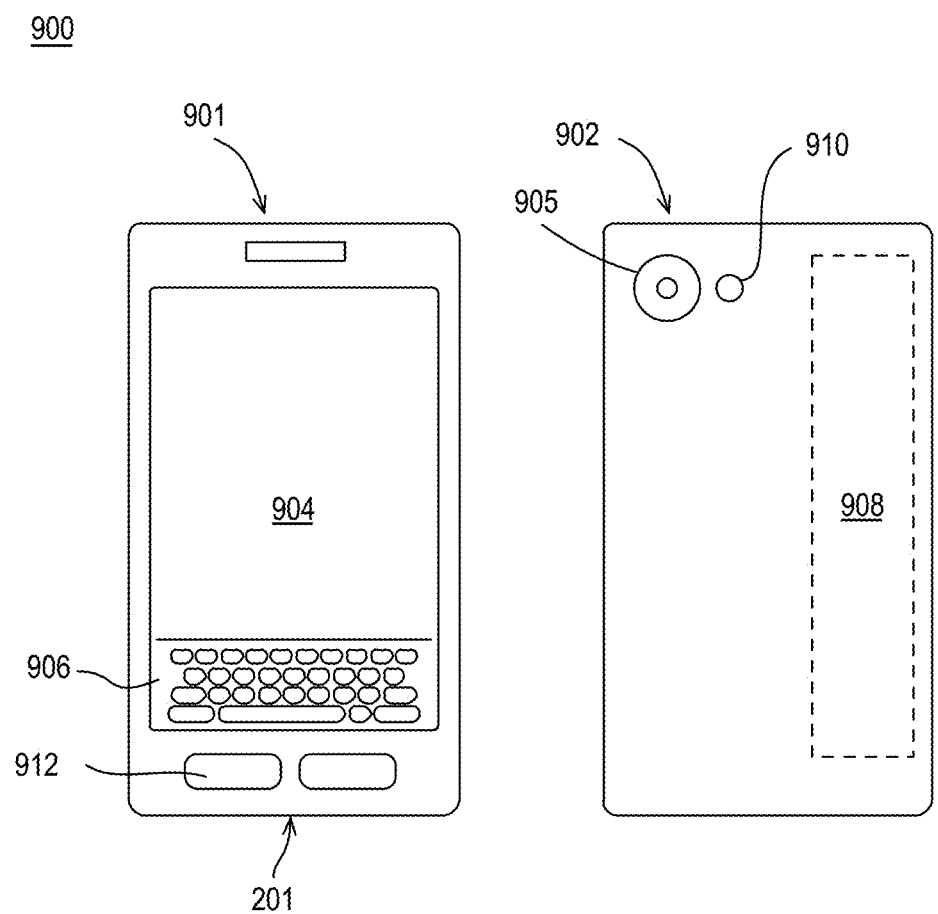
FIG. 9 illustrates an example device, all arranged in accordance with at least some implementations of the present disclosure.

As described above, system 800 may be embodied in varying physical styles or form factors. FIG. 9 illustrates implementations of a small form factor device, arranged in accordance with at least some implementations of the present disclosure. In some examples, system 800 may be implemented via device 900. In other examples, other devices or systems, or portions thereof may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone 201, or may be digitized by a voice recognition device. As shown, device 900 may include a camera 905 (e.g., including a lens, an aperture, and an imaging sensor) and a flash 910 integrated into back 902 (or elsewhere) of device 900.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for speaker recognition comprises determining a speaker recognition score based on a received audio input, generating a speech to noise ratio based on the received audio input, generating a noise type label corresponding to the received audio input, determining an adaptive speaker recognition threshold based at least in part on the speech to noise ratio and the noise type label, and performing speaker recognition for the received audio input based on a comparison of the speaker recognition score to the speaker acceptance threshold.

Further to the first embodiments, determining the adaptive speaker recognition threshold comprises determining the speaker acceptance threshold based on the speech to noise ratio, the noise type label, and at least one of a target false accept rate or a target false reject rate corresponding to the received audio input.

Further to the first embodiments, determining the adaptive speaker recognition threshold comprises determining the speaker acceptance threshold based on the speech to noise ratio, the noise type label, and at least one of a target false accept rate or a target false reject rate corresponding to the received audio input and the method further comprises determining the target false accept rate or the target false reject rate based on a speaker recognition application corresponding to the received audio input.

Further to the first embodiments, determining the adaptive speaker recognition threshold comprises determining the speaker acceptance threshold based on the speech to noise ratio, the noise type label, and at least one of a target false accept rate or a target false reject rate corresponding to the received audio input and the method further comprises determining the target false accept rate or the target false reject rate based on a speaker recognition application corresponding to the received audio input, wherein the target false accept rate comprises a first value when the speaker recognition application comprises a biometric security application and a second value when the speaker recognition application comprises an authenticated command application, and wherein the first value is less than the second value.

Further to the first embodiments, determining the adaptive speaker recognition threshold comprises determining the speaker acceptance threshold based on the speech to noise ratio, the noise type label, and at least one of a target false accept rate or a target false reject rate corresponding to the received audio input, wherein determining the adaptive speaker recognition threshold comprises accessing a look up table based on the speech to noise ratio, the noise type label, and at least one of a target false accept rate or a target false reject rate to determine the speaker acceptance threshold.

Further to the first embodiments, the method further comprises determining a second adaptive speaker recognition threshold based at least in part on a second speech to noise ratio and a second noise type label corresponding to a second received audio input and performing a second speaker recognition for the second received audio input based on a second comparison of a second speaker recognition score to the second adaptive speaker recognition threshold, wherein the first and second adaptive speaker recognition thresholds are different.

Further to the first embodiments, performing speaker recognition comprises accepting the received audio input as corresponding to a target user when the speaker recognition score exceeds the adaptive speaker recognition threshold or rejecting the received audio input as corresponding to the target user when the speaker recognition score does not exceed the adaptive speaker recognition threshold.

Further to the first embodiments, the method further comprises determining a second speaker recognition score based on the received audio input, wherein determining the speaker recognition score comprises applying a speaker model corresponding to a first user and determining the second speaker recognition score comprises applying a second speaker model corresponding to a second user, wherein the first and second speaker models are different and wherein performing the speaker recognition comprises a second comparison of the second speaker recognition score to the adaptive speaker recognition threshold.

Further to the first embodiments, the method further comprises determining a second speaker recognition score based on the received audio input, wherein determining the speaker recognition score comprises applying a speaker model corresponding to a first user and determining the second speaker recognition score comprises applying a second speaker model corresponding to a second user, wherein the first and second speaker models are different, and wherein performing the speaker recognition comprises a second comparison of the second speaker recognition score to the adaptive speaker recognition threshold and providing an identified speaker indicator corresponding to the first user or the second user based on the comparison and the second comparison.

Further to the first embodiments, at least one of determining the speaker recognition score, generating the speech to noise ratio, or generating the noise type label comprises extracting features from the received audio input and applying a pretrained classification model to the features.

In one or more second embodiments, a system for performing speaker recognition comprises a memory configured to store a received audio input and a digital signal processor coupled to the memory, the digital signal processor to determine a speaker recognition score based on a received audio input, to generate a speech to noise ratio based on the received audio input, to generate a noise type label corresponding to the received audio input, to determine an adaptive speaker recognition threshold based at least in part on the speech to noise ratio and the noise type label, and to perform speaker recognition for the received audio input based on a comparison of the speaker recognition score to the speaker acceptance threshold.

Further to the second embodiments, the digital signal processor to determine the adaptive speaker recognition threshold comprises the digital signal processor to determine the speaker acceptance threshold based on the speech to noise ratio, the noise type label, and at least one of a target false accept rate or a target false reject rate corresponding to the received audio input.

Further to the second embodiments, the digital signal processor to determine the adaptive speaker recognition threshold comprises the digital signal processor to determine the speaker acceptance threshold based on the speech to noise ratio, the noise type label, and at least one of a target false accept rate or a target false reject rate corresponding to the received audio input, wherein the digital signal processor is to determine the target false accept rate or the target false reject rate based on a speaker recognition application corresponding to the received audio input.

Further to the second embodiments, the digital signal processor to determine the adaptive speaker recognition threshold comprises the digital signal processor to determine the speaker acceptance threshold based on the speech to noise ratio, the noise type label, and at least one of a target false accept rate or a target false reject rate corresponding to the received audio input, wherein the digital signal processor is to determine the target false accept rate or the target false reject rate based on a speaker recognition application corresponding to the received audio input, wherein the target false accept rate comprises a first value when the speaker recognition application comprises a biometric security application and a second value when the speaker recognition application comprises an authenticated command application, and wherein the first value is less than the second value.

Further to the second embodiments, the digital signal processor to determine the adaptive speaker recognition threshold comprises the digital signal processor to determine the speaker acceptance threshold based on the speech to noise ratio, the noise type label, and at least one of a target false accept rate or a target false reject rate corresponding to the received audio input, wherein the digital signal processor to determine the adaptive speaker recognition threshold comprises the digital signal processor to access a look up table based on the speech to noise ratio, the noise type label, and at least one of a target false accept rate or a target false reject rate to determine the speaker acceptance threshold.

Further to the second embodiments, the digital signal processor is to determine a second adaptive speaker recognition threshold based at least in part on a second speech to noise ratio and a second noise type label corresponding to a second received audio input and to perform a second speaker recognition for the second received audio input based on a second comparison of a second speaker recognition score to the second adaptive speaker recognition threshold, wherein the first and second adaptive speaker recognition thresholds are different.

Further to the second embodiments, the digital signal processor to perform speaker recognition comprises the digital signal processor to accept the received audio input as corresponding to a target user when the speaker recognition score exceeds the adaptive speaker recognition threshold or to reject the received audio input as corresponding to the target user when the speaker recognition score does not exceed the adaptive speaker recognition threshold.

Further to the second embodiments, the digital signal processor is to determine a second speaker recognition score based on the received audio input, wherein to determine the speaker recognition score comprises the digital signal processor to apply a speaker model corresponding to a first user and to determine the second speaker recognition score comprises the digital signal processor to apply a second speaker model corresponding to a second user, wherein the first and second speaker models are different, and wherein the digital signal processor to perform the speaker recognition comprises the digital signal processor to perform a second comparison of the second speaker recognition score to the adaptive speaker recognition threshold.

Further to the second embodiments, the digital signal processor is to determine a second speaker recognition score based on the received audio input, wherein to determine the speaker recognition score comprises the digital signal processor to apply a speaker model corresponding to a first user and to determine the second speaker recognition score comprises the digital signal processor to apply a second speaker model corresponding to a second user, wherein the first and second speaker models are different, and wherein the digital signal processor to perform the speaker recognition comprises the digital signal processor to perform a second comparison of the second speaker recognition score to the adaptive speaker recognition threshold, wherein the digital signal processor is to provide an identified speaker indicator corresponding to the first user or the second user based on the comparison and the second comparison.

Further to the second embodiments, at least one of the digital signal processor to determine the speaker recognition score, generate the speech to noise ratio, or generate the noise type label comprises the digital signal processor to extract features from the received audio input and to apply a pretrained classification model to the features.

In one or more third embodiments, a system comprises means for determining a speaker recognition score based on a received audio input, means for generating a speech to noise ratio based on the received audio input, means for generating a noise type label corresponding to the received audio input, means for determining an adaptive speaker recognition threshold based at least in part on the speech to noise ratio and the noise type label, and means for performing speaker recognition for the received audio input based on a comparison of the speaker recognition score to the speaker acceptance threshold.

Further to the third embodiments, the means for determining the adaptive speaker recognition threshold comprise means for determining the speaker acceptance threshold based on the speech to noise ratio, the noise type label, and at least one of a target false accept rate or a target false reject rate corresponding to the received audio input.

Further to the third embodiments, the means for determining the adaptive speaker recognition threshold comprise means for determining the speaker acceptance threshold based on the speech to noise ratio, the noise type label, and at least one of a target false accept rate or a target false reject rate corresponding to the received audio input and the system further comprises means for determining the target false accept rate or the target false reject rate based on a speaker recognition application corresponding to the received audio input.

Further to the third embodiments, the means for determining the adaptive speaker recognition threshold comprise means for determining the speaker acceptance threshold based on the speech to noise ratio, the noise type label, and at least one of a target false accept rate or a target false reject rate corresponding to the received audio input, wherein the means for determining the adaptive speaker recognition threshold comprise means for accessing a look up table based on the speech to noise ratio, the noise type label, and at least one of a target false accept rate or a target false reject rate to determine the speaker acceptance threshold.

Further to the third embodiments, the system further comprises means for determining a second adaptive speaker recognition threshold based at least in part on a second speech to noise ratio and a second noise type label corresponding to a second received audio input and means for performing a second speaker recognition for the second received audio input based on a second comparison of a second speaker recognition score to the second adaptive speaker recognition threshold, wherein the first and second adaptive speaker recognition thresholds are different.

Further to the third embodiments, the means for performing speaker recognition comprise means for accepting the received audio input as corresponding to a target user when the speaker recognition score exceeds the adaptive speaker recognition threshold and means for rejecting the received audio input as corresponding to the target user when the speaker recognition score does not exceed the adaptive speaker recognition threshold.

Further to the third embodiments, the system further comprises means for determining a second speaker recognition score based on the received audio input, wherein the means for determining the speaker recognition score comprise means for applying a speaker model corresponding to a first user and the means for determining the second speaker recognition score comprise means for applying a second speaker model corresponding to a second user, wherein the first and second speaker models are different, and wherein the means for performing the speaker recognition comprise means for performing a second comparison of the second speaker recognition score to the adaptive speaker recognition threshold.

In one or more fourth embodiments, at least one machine readable medium comprises a plurality of instructions that, in response to being executed on a device, cause the device to provide speaker recognition by determining a speaker recognition score based on a received audio input, generating a speech to noise ratio based on the received audio input, generating a noise type label corresponding to the received audio input, determining an adaptive speaker recognition threshold based at least in part on the speech to noise ratio and the noise type label, and performing speaker recognition for the received audio input based on a comparison of the speaker recognition score to the speaker acceptance threshold.

Further to the fourth embodiments, determining the adaptive speaker recognition threshold comprises determining the speaker acceptance threshold based on the speech to noise ratio, the noise type label, and at least one of a target false accept rate or a target false reject rate corresponding to the received audio input.

Further to the fourth embodiments, determining the adaptive speaker recognition threshold comprises determining the speaker acceptance threshold based on the speech to noise ratio, the noise type label, and at least one of a target false accept rate or a target false reject rate corresponding to the received audio input and the machine readable medium further comprises a plurality of instructions that, in response to being executed on the device, cause the device to provide speaker recognition by determining the target false accept rate or the target false reject rate based on a speaker recognition application corresponding to the received audio input.

Further to the fourth embodiments, determining the adaptive speaker recognition threshold comprises determining the speaker acceptance threshold based on the speech to noise ratio, the noise type label, and at least one of a target false accept rate or a target false reject rate corresponding to the received audio input, wherein determining the adaptive speaker recognition threshold comprises accessing a look up table based on the speech to noise ratio, the noise type label, and at least one of a target false accept rate or a target false reject rate to determine the speaker acceptance threshold.

Further to the fourth embodiments, the machine readable medium further comprises a plurality of instructions that, in response to being executed on the device, cause the device to provide speaker recognition by determining a second adaptive speaker recognition threshold based at least in part on a second speech to noise ratio and a second noise type label corresponding to a second received audio input and performing a second speaker recognition for the second received audio input based on a second comparison of a second speaker recognition score to the second adaptive speaker recognition threshold, wherein the first and second adaptive speaker recognition thresholds are different.

Further to the fourth embodiments, performing speaker recognition comprises accepting the received audio input as corresponding to a target user when the speaker recognition score exceeds the adaptive speaker recognition threshold or rejecting the received audio input as corresponding to the target user when the speaker recognition score does not exceed the adaptive speaker recognition threshold.

Further to the fourth embodiments, the machine readable medium further comprises a plurality of instructions that, in response to being executed on the device, cause the device to provide speaker recognition by determining a second speaker recognition score based on the received audio input, wherein determining the speaker recognition score comprises applying a speaker model corresponding to a first user and determining the second speaker recognition score comprises applying a second speaker model corresponding to a second user, wherein the first and second speaker models are different, and wherein performing the speaker recognition comprises a second comparison of the second speaker recognition score to the adaptive speaker recognition threshold.

In one or more fifth embodiments, at least one machine readable medium may include a plurality of instructions that, in response to being executed on a computing device, cause the computing device to perform a method or any functions according to any one of the above embodiments.

In one or more sixth embodiments, an apparatus or a system may include means for performing a method or any functions according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for speaker recognition comprising:
    determining a speaker recognition score based on a received audio input;
    generating a speech to noise ratio based on the received audio input;
    generating a noise type label corresponding to the received audio input;
    determining a selected adaptive speaker recognition threshold from a plurality of adaptive speaker recognition thresholds based on the speech to noise ratio, the noise type label, and a target false accept rate corresponding to the received audio input, wherein each of the plurality of adaptive speaker recognition thresholds is associated with a particular noise type label, a particular speech to noise ratio, and a particular target false accept rate, and wherein each of the plurality of adaptive speaker recognition thresholds provides a threshold corresponding to a lowest target false reject rate for the particular noise type label, the particular speech to noise ratio, and the particular target false accept rate; and
    performing speaker recognition for the received audio input based on a comparison of the speaker recognition score to the selected adaptive speaker recognition threshold.

2. The method of claim 1, further comprising:
    determining the target false accept rate based on a speaker recognition application corresponding to the received audio input.

3. The method of claim 2, wherein the target false accept rate comprises a first value when the speaker recognition application comprises a biometric security application and a second value when the speaker recognition application comprises an authenticated command application, and wherein the first value is less than the second value.

4. The method of claim 1, wherein determining the selected adaptive speaker recognition threshold comprises accessing a look up table based on the speech to noise ratio, the noise type label, and the target false accept rate.

5. The method of claim 1, further comprising:
    determining a second selected adaptive speaker recognition threshold from the plurality of adaptive speaker recognition thresholds based on a second speech to noise ratio, a second noise type label, and a second target false accept rate corresponding to a second received audio input; and
    performing a second speaker recognition for the second received audio input based on a second comparison of a second speaker recognition score to the second selected adaptive speaker recognition threshold, wherein the first and second selected adaptive speaker recognition thresholds are different.

6. The method of claim 1, wherein performing speaker recognition comprises accepting the received audio input as corresponding to a target user when the speaker recognition score exceeds the selected adaptive speaker recognition threshold or rejecting the received audio input as corresponding to the target user when the speaker recognition score does not exceed the selected adaptive speaker recognition threshold.

7. The method of claim 1, further comprising:
    determining a second speaker recognition score based on the received audio input, wherein determining the speaker recognition score comprises applying a first speaker model corresponding to a first user and determining the second speaker recognition score comprises applying a second speaker model corresponding to a second user, wherein the first and second speaker models are different, and
    wherein performing the speaker recognition comprises a second comparison of the second speaker recognition score to the selected adaptive speaker recognition threshold.

8. The method of claim 7, wherein the speaker recognition score and the second speaker recognition score both exceed the selected adaptive speaker recognition threshold, the method further comprising:
    providing an identified speaker indicator corresponding to the first user based on the speaker recognition score exceeding the second speaker recognition score.

9. The method of claim 1, wherein at least one of determining the speaker recognition score, generating the speech to noise ratio, or generating the noise type label comprises extracting features from the received audio input and applying a pretrained classification model to the features.

10. A system for performing speaker recognition comprising:
a memory configured to store a received audio input; and
a digital signal processor coupled to the memory, the digital signal processor to determine a speaker recognition score based on a received audio input, to generate a speech to noise ratio based on the received audio input, to generate a noise type label corresponding to the received audio input, to determine a selected adaptive speaker recognition threshold from a plurality of adaptive speaker recognition thresholds based on the speech to noise ratio, the noise type label, and a target false accept rate corresponding to the received audio input, wherein each of the plurality of adaptive speaker recognition thresholds is associated with a particular noise type label, a particular speech to noise ratio, and a particular target false accept rate, and wherein each of the plurality of adaptive speaker recognition thresholds provides a threshold corresponding to a lowest target false reject rate for the particular noise type label, the particular speech to noise ratio, and the particular target false accept rate, and to perform speaker recognition for the received audio input based on a comparison of the speaker recognition score to the selected adaptive speaker recognition threshold.

11. The system of claim 10, wherein the digital signal processor is to determine the target false accept rate based on a speaker recognition application corresponding to the received audio input.

12. The system of claim 10, wherein the digital signal processor to determine the adaptive speaker recognition threshold comprises the digital signal processor to access a look up table based on the speech to noise ratio, the noise type label, and the target false accept rate.

13. The system of claim 10, wherein the digital signal processor is to determine a second selected adaptive speaker recognition threshold from the plurality of adaptive speaker recognition thresholds based on a second speech to noise ratio, a second noise type label, and a second target false accept rate corresponding to a second received audio input and to perform a second speaker recognition for the second received audio input based on a second comparison of a second speaker recognition score to the second selected adaptive speaker recognition threshold, wherein the first and second selected adaptive speaker recognition thresholds are different.

14. The system of claim 10, wherein the digital signal processor to perform speaker recognition comprises the digital signal processor to accept the received audio input as corresponding to a target user when the speaker recognition score exceeds the selected adaptive speaker recognition threshold or to reject the received audio input as corresponding to the target user when the speaker recognition score does not exceed the selected adaptive speaker recognition threshold.

15. The system of claim 10, wherein the digital signal processor is to determine a second speaker recognition score based on the received audio input, wherein to determine the speaker recognition score comprises the digital signal processor to apply a first speaker model corresponding to a first user and to determine the second speaker recognition score comprises the digital signal processor to apply a second speaker model corresponding to a second user, wherein the first and second speaker models are different, and
wherein the digital signal processor to perform the speaker recognition comprises the digital signal processor to perform a second comparison of the second speaker recognition score to the selected adaptive speaker recognition threshold.

16. At least one non-transitory machine readable medium comprising a plurality of instructions that, in response to being executed on a device, cause the device to provide speaker recognition by:
determining a speaker recognition score based on a received audio input;
generating a speech to noise ratio based on the received audio input;
generating a noise type label corresponding to the received audio input;
determining a selected adaptive speaker recognition threshold from a plurality of adaptive speaker recognition thresholds based on the speech to noise ratio, the noise type label, and a target false accept rate corresponding to the received audio input, wherein each of the plurality of adaptive speaker recognition thresholds is associated with a particular noise type label, a particular speech to noise ratio, and a particular target false accept rate, and wherein each of the plurality of adaptive speaker recognition thresholds provides a threshold corresponding to a lowest target false reject rate for the particular noise type label, the particular speech to noise ratio, and the particular target false accept rate; and
performing speaker recognition for the received audio input based on a comparison of the speaker recognition score to the selected adaptive speaker recognition threshold.

17. The machine readable medium of claim 16, further comprising a plurality of instructions that, in response to being executed on the device, cause the device to provide speaker recognition by:
determining the target false accept rate based on a speaker recognition application corresponding to the received audio input.

18. The machine readable medium of claim 16, wherein determining the selected adaptive speaker recognition threshold comprises accessing a look up table based on the speech to noise ratio, the noise type label, and the target false accept rate.

19. The machine readable medium of claim 16, further comprising a plurality of instructions that, in response to being executed on the device, cause the device to provide speaker recognition by:
determining a second selected adaptive speaker recognition threshold from the plurality of adaptive speaker recognition thresholds based on a second speech to noise ratio, a second noise type label, and a second target false accept rate corresponding to a second received audio input; and
performing a second speaker recognition for the second received audio input based on a second comparison of a second speaker recognition score to the second selected adaptive speaker recognition threshold, wherein the first and second selected adaptive speaker recognition thresholds are different.

20. The machine readable medium of claim 16, wherein performing speaker recognition comprises accepting the received audio input as corresponding to a target user when the speaker recognition score exceeds the selected adaptive speaker recognition threshold or rejecting the received audio input as corresponding to the target user when the speaker recognition score does not exceed the selected adaptive speaker recognition threshold.

21. The machine readable medium of claim 16, further comprising a plurality of instructions that, in response to being executed on the device, cause the device to provide speaker recognition by:

determining a second speaker recognition score based on the received audio input, wherein determining the speaker recognition score comprises applying a first speaker model corresponding to a first user and determining the second speaker recognition score comprises applying a second speaker model corresponding to a second user, wherein the first and second speaker models are different, and wherein performing the speaker recognition comprises a second comparison of the second speaker recognition score to the selected adaptive speaker recognition threshold.

22. The machine readable medium of claim 21, wherein the speaker recognition score and the second speaker recognition score both exceed the selected adaptive speaker recognition threshold, the machine readable medium further comprising a plurality of instructions that, in response to being executed on the device, cause the device to provide speaker recognition by:

providing an identified speaker indicator corresponding to the first user based on the speaker recognition score exceeding the second speaker recognition score.

23. The system of claim 14, wherein the speaker recognition score and the second speaker recognition score both exceed the selected adaptive speaker recognition threshold and the digital signal processor is further to provide an identified speaker indicator corresponding to the first user based on the speaker recognition score exceeding the second speaker recognition score.

* * * * *